US008009591B2

(12) United States Patent
Retana et al.

(10) Patent No.: US 8,009,591 B2
(45) Date of Patent: Aug. 30, 2011

(54) AUTOMATIC OVERLAPPING AREAS THAT FLOOD ROUTING INFORMATION

(75) Inventors: Alvaro Retana, Raleigh, NC (US); Russell White, Holly Springs, NC (US); David Anthony Cook, Raleigh, NC (US); Yi Yang, Morrisville, NC (US); Madhavi Chandra, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 832 days.

(21) Appl. No.: 11/565,608

(22) Filed: Nov. 30, 2006

(65) Prior Publication Data

US 2008/0130500 A1 Jun. 5, 2008

(51) Int. Cl.
*H04L 12/28* (2006.01)
(52) U.S. Cl. .............. 370/255; 370/236.2; 370/400
(58) Field of Classification Search .......... 370/235, 370/392, 409, 395.31, 236.2, 255, 400; 455/445
See application file for complete search history.

(56) References Cited

U.S. PATENT DOCUMENTS

| | | | |
|---|---|---|---|
| 6,023,724 A | 2/2000 | Bhatia et al. | |
| 6,046,985 A | 4/2000 | Aldred et al. | |
| 6,314,105 B1 | 11/2001 | Luong | |
| 6,473,431 B1 | 10/2002 | Perlman et al. | |
| 6,519,231 B1 | 2/2003 | Ding et al. | |
| 6,654,359 B1 | 11/2003 | La Porta et al. | |
| 6,678,241 B1 | 1/2004 | Gai et al. | |
| 6,690,653 B1 | 2/2004 | Anbiah et al. | |
| 6,704,301 B2 * | 3/2004 | Chari et al. ............ 370/351 |
| 6,711,152 B1 * | 3/2004 | Kalmanek et al. ........... 370/351 |
| 6,721,290 B1 | 4/2004 | Kondylis et al. | |
| 6,721,344 B2 | 4/2004 | Nakao et al. | |
| 6,744,775 B1 * | 6/2004 | Beshai et al. .............. 370/409 |
| 6,826,621 B1 | 11/2004 | Kephart et al. | |
| 6,865,151 B1 * | 3/2005 | Saunders .................... 370/230 |
| 6,961,310 B2 | 11/2005 | Cain | |

(Continued)

FOREIGN PATENT DOCUMENTS

CN 1489870 4/2004

(Continued)

OTHER PUBLICATIONS

J. Moy,"Open Shortest Path First (OSPF) Version 2," Request for Comments (RFC) 2328, Apr. 1998,185pp,Internet Engineering Task Force (IETF), Internet, ietf.org.

(Continued)

*Primary Examiner* — Jason E Mattis
(74) *Attorney, Agent, or Firm* — Patent Capital Group

(57) ABSTRACT

In one embodiment, a method includes receiving on a first communication link at a local router all routing information at a certain level of detail for each router of multiple routers communicating in a first flooding domain. A measure of distance is determined from a particular router in the first flooding domain to the local router. It is determined whether the measure of distance exceeds a threshold. If the measure of distance exceeds the threshold, then summary routing information with less than the certain level of detail is determined for the particular router. Also, certain routing information is sent over a different second communication link at the local router. The certain routing information includes the summary information for the particular router, and all routing information at the certain level of detail for a subset of routers communicating in the first flooding domain, which subset excludes the particular router.

19 Claims, 7 Drawing Sheets

U.S. PATENT DOCUMENTS

| | | | |
|---|---|---|---|
| 6,963,575 | B1 | 11/2005 | Sistanizadeh et al. |
| 7,002,949 | B2 | 2/2006 | Garcia-Luna-Aceves et al. |
| 7,184,421 | B1* | 2/2007 | Liu et al. |
| 7,190,696 | B1 | 3/2007 | Manur et al. |
| 7,286,479 | B2 | 10/2007 | Bragg |
| 7,444,153 | B2* | 10/2008 | Yokota |
| 7,533,166 | B2 | 5/2009 | Beyda |
| 7,609,672 | B2 | 10/2009 | Retana et al. |
| 7,609,838 | B2* | 10/2009 | Westhoff et al. |
| 2001/0024443 | A1 | 9/2001 | Alriksson et al. |
| 2002/0075807 | A1 | 6/2002 | Troxel et al. |
| 2002/0082035 | A1* | 6/2002 | Aihara et al. |
| 2002/0101821 | A1 | 8/2002 | Feldmann et al. |
| 2002/0112060 | A1 | 8/2002 | Kato |
| 2003/0026268 | A1 | 2/2003 | Navas |
| 2003/0037168 | A1 | 2/2003 | Brabson et al. |
| 2003/0095554 | A1 | 5/2003 | Shimizu |
| 2003/0112799 | A1 | 6/2003 | Chandra et al. |
| 2003/0174653 | A1 | 9/2003 | Basu et al. |
| 2003/0218988 | A1 | 11/2003 | Han et al. |
| 2003/0223379 | A1 | 12/2003 | Yang et al. |
| 2004/0081152 | A1* | 4/2004 | Thubert et al. |
| 2004/0081154 | A1 | 4/2004 | Kouvelas |
| 2004/0085912 | A1 | 5/2004 | Xu et al. |
| 2004/0085928 | A1 | 5/2004 | Chari et al. |
| 2004/0162819 | A1* | 8/2004 | Omae et al. ........................ 707/3 |
| 2004/0196843 | A1 | 10/2004 | Zinin |
| 2004/0208175 | A1 | 10/2004 | McCabe |
| 2005/0030921 | A1 | 2/2005 | Yau |
| 2005/0047353 | A1 | 3/2005 | Hares |
| 2005/0074019 | A1* | 4/2005 | Handforth et al. ............ 370/406 |
| 2005/0089015 | A1 | 4/2005 | Tsuge et al. |
| 2005/0220077 | A1 | 10/2005 | Vereecke et al. |
| 2005/0221752 | A1 | 10/2005 | Jamieson et al. |
| 2006/0140111 | A1 | 6/2006 | Vasseur et al. |
| 2006/0159082 | A1* | 7/2006 | Cook et al. ..................... 370/389 |
| 2006/0159095 | A1 | 7/2006 | Cook et al. |
| 2006/0165009 | A1 | 7/2006 | Nguyen et al. |
| 2006/0198321 | A1 | 9/2006 | Nadeau et al. |
| 2007/0019593 | A1 | 1/2007 | Sarkar |
| 2007/0053295 | A1* | 3/2007 | Cleveland et al. ............ 370/235 |
| 2007/0091795 | A1 | 4/2007 | Bonaventure et al. |
| 2007/0165532 | A1 | 7/2007 | Retana et al. |
| 2007/0214283 | A1 | 9/2007 | Metke et al. |
| 2008/0002640 | A1* | 1/2008 | Westphal ....................... 370/338 |
| 2008/0056157 | A1 | 3/2008 | Retana et al. |
| 2008/0062947 | A1 | 3/2008 | Retana et al. |
| 2009/0086663 | A1* | 4/2009 | Ho et al. |
| 2010/0008231 | A1 | 1/2010 | Retana et al. |
| 2010/0098090 | A1* | 4/2010 | Westhoff et al. |

FOREIGN PATENT DOCUMENTS

| | | |
|---|---|---|
| CN | 101390321 | 3/2009 |
| CN | 101523813 | 9/2009 |
| EP | 1974486 | 3/2009 |
| EP | 2070260 | 6/2009 |
| WO | WO 2007/117727 A2 | 10/2007 |
| WO | WO 2008/027668 A1 | 3/2008 |
| WO | WO 2008/033618 | 3/2008 |
| WO | WO 2008/067041 | 6/2008 |

OTHER PUBLICATIONS

"NovaRoam: Dynamic Routing for Mobile Networks," 2000, novaroam.com/downloads/wp_tora.pdf, Nova Engineering, Inc., Cincinnati, Ohio, USA.

C. Small, "Radio Shortest Path First (RSPF) Specification, IV. Link state propagation," 2000, 9pp, rspf.sourceforge.net/rspfspec4. html,Internet.

Park and Corson, "Temporally-Ordered Routing Algorithm (TORA) Version 1 Functional Specification," Jul. 20, 2001, 22pp, ietf. org,draft-ietf-manet-tora-spec-04,IETF, Internet-Draft.

Kennicott and Fisk,"Dynamic Allocation of Nodes on a large Space-shared Cluster,"2001,23pp,cacr.caltech.edu/cluster2001/program/talks/kennicott.pdf, CalTech,Pasadena,CA,US.

Kaya et al., "SQS: An Experimental Scalable Network Structure for Efficient Querying of Micro Sensors,"2003, 12pp,cse.yeditepe.edu. tr/tnl/wisent/htmls/pubs/sqs.pdf,Istanbl.

Karp and Kung,"GPSR:Greedy Perimeter Stateless Routing for Wireless Networks," 2000,12pp,eecs.harvard.edu/networking/papers/karp-kung-gpsr-500.pdf, Harvard, Cambridge, MA,US.

Curran,"SWARM: cooperative Reinforcement Learning for Routing in Ad-hoc Networks,"2003,84pp, cs.tcd.ie/publications/tech-reports/reports.03/TCD-CS-2003-6.pdf,TrinityCol,Dublin.

Corson,Park,Impett,"Temporlaly-Ordered Routing Algorithm," 2006,2pp, www.isr.umd.edu/ISR/accomplishments/037_Routing, Univeristy of Maryland, Inst.SystemsRes.,Baltimore, MD,US.

International Search Report for International Application No. PCT/US07/60289 mailed Apr. 18, 2008 (3 pages).

International Preliminary Report on Patentability issued Jul. 22, 2008 (1 page) and Written Opinion mailed Apr. 18, 2008 (5 pages) for International Application No. PCT/US07/60289.

International Preliminary Report on Patentability issued Mar. 3, 2009 (1page) Written Opinion mailed Feb. 4, 2008 (6 pages) for International Application No. PCT/US07/073940.

International Search Report for International Application No. PCT/US07/073940 mailed Feb. 4, 2008 (1 page).

Notification of Transmittal of the International Search Report and the Written Opinion of the International Searching Authority, or the Declaration (1 page), International Search Report (2 pages), and Notification of Transmittal of the International Search Report and the Written Opinion of the International Searching Authority, or the Declaration (3 pages) for International Application No. PCT/US07/74890 mailed Jan. 30, 2008.

International Search Report for International Application No. PCT/US07/80857 mailed Mar. 21, 2008 (1 page).

International Preliminary Report on Patentability issued Jun. 3, 2009 (1 page) and Written Opinion of the International Searching Authority mailed Mar. 21, 2008 (4 pages) for International Application No. PCT/US07/80857.

USPTO Mar. 18, 2003 Notice of Allowance from U.S. Appl. No. 11/862,713.

State Intellectual Property Office of the People's Republic of China, Application No. 200780033858.6, Date of Issue Feb. 24, 2011, The First Office Action, 12 pages.

PRC Apr. 8, 2011 SIPO First Office Action for Application No. 2007800032937 [English Translation only available—mailed from foreign associate Jun. 16, 2011]; 9 pages.

* cited by examiner

100 MOBILE AD HOC NETWORK

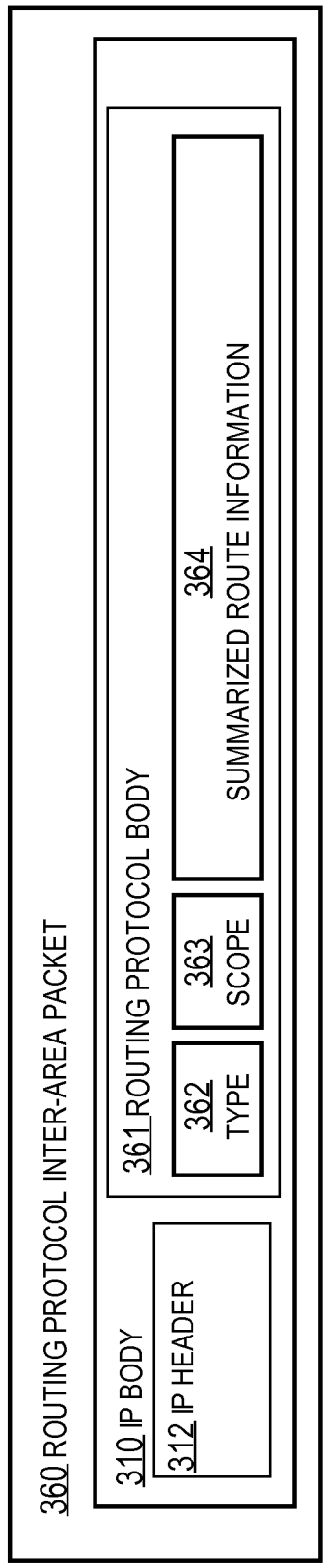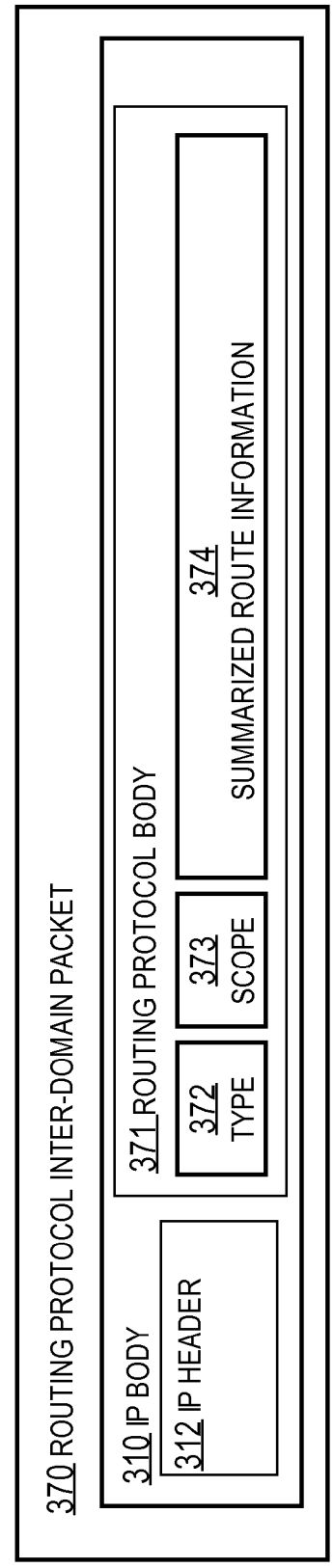

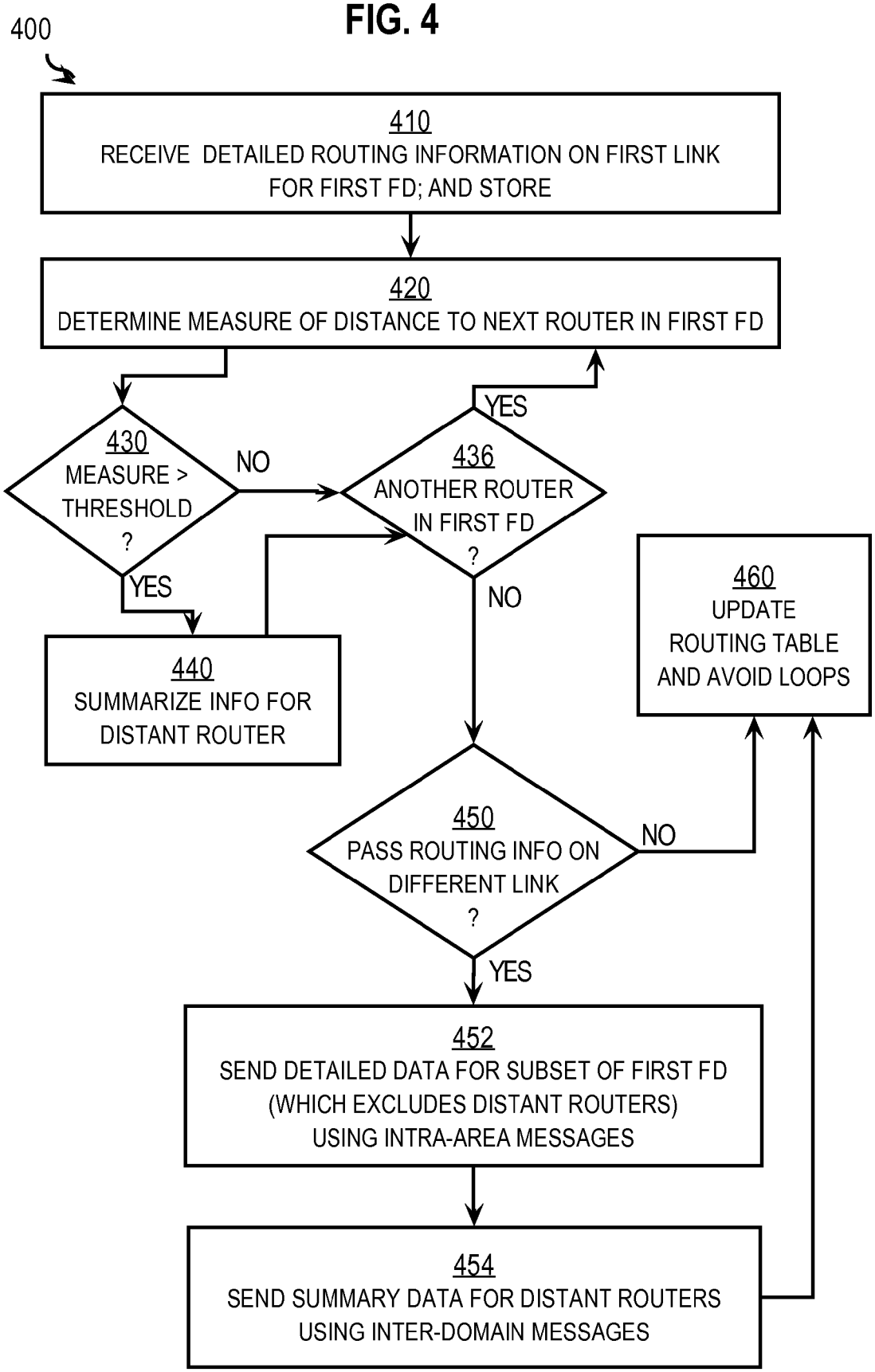

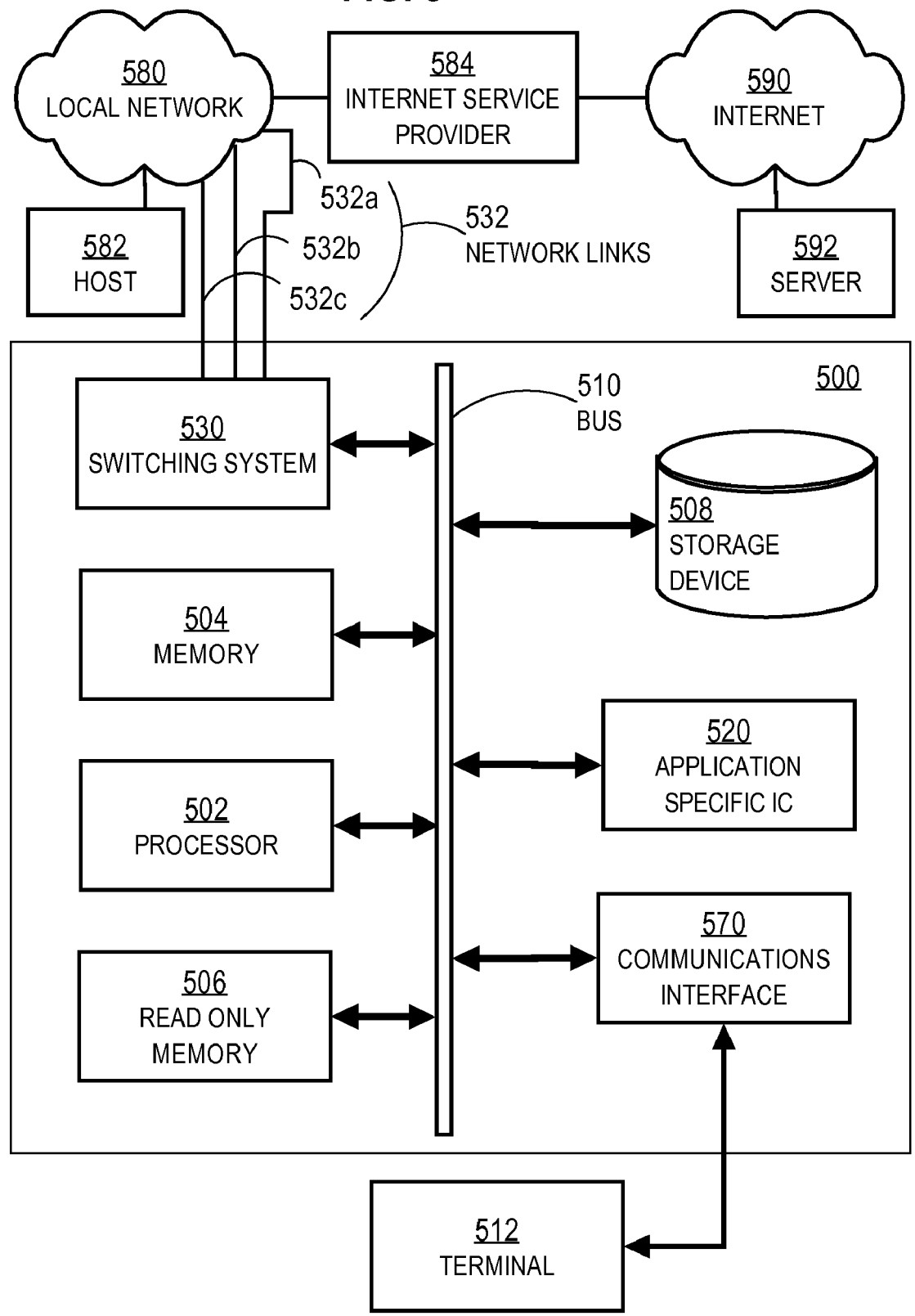

AUTOMATIC OVERLAPPING AREAS THAT FLOOD ROUTING INFORMATION

BACKGROUND OF THE INVENTION

1. Field of the Invention

The present invention relates to passing routing information among intermediate network nodes, such as among mobile routers in a wireless mobile ad hoc network (MANET).

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

Routers and switches are intermediate network nodes that determine which communication link or links to employ to support the progress of data packets through the network. An intermediate network node that determines which links to employ based on information in an internetwork header portion of a data packet is called a router.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3C illustrates an example routing protocol inter-area packet, according to an embodiment;

FIG. 3D illustrates an example routing protocol inter-domain packet, according to an embodiment;

FIG. 4 illustrates at a high level an example method for sharing routing information between two routers, according to an embodiment; and FIG. 5 that illustrates an example computer system upon which an embodiment of the invention may be implemented.

DETAILED DESCRIPTION

Figure 1:
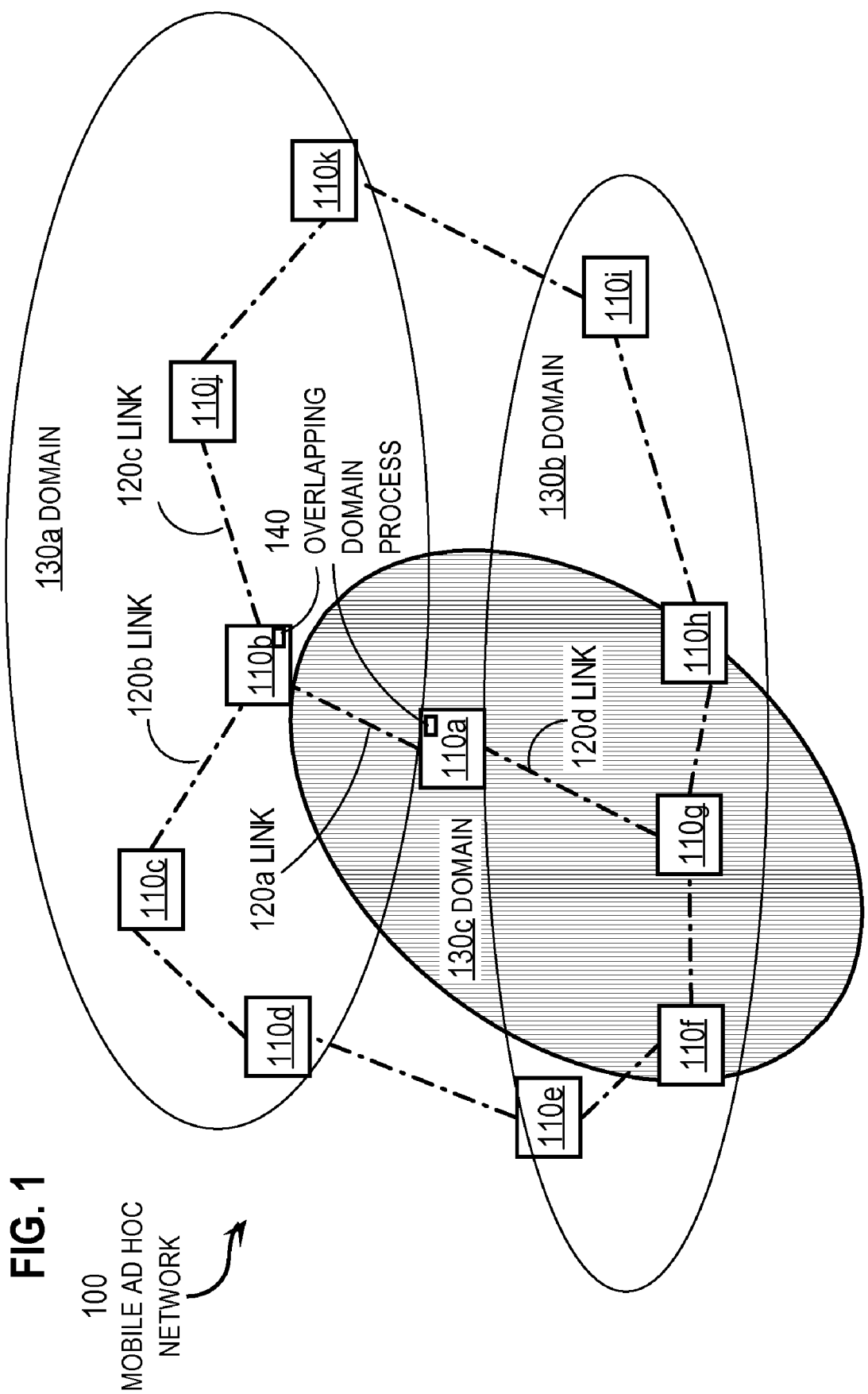
FIG. 1 illustrates an example mobile ad hoc network, according to an embodiment.

Techniques are described for sharing routing information among routers. For purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 Overview

In one set of embodiments, a method includes receiving on a first communication link at a local router all routing information at a certain level of detail for each router of multiple routers communicating in a first flooding domain. A measure of distance is determined from a particular router in the first flooding domain to the local router. It is determined whether the measure of distance exceeds a threshold. If the measure of distance exceeds the threshold, then summary routing information with less than the certain level of detail is determined for the particular router. Also, if the measure of distance exceeds the threshold, certain routing information is sent over a different second communication link at the local router. The certain routing information includes the summary information for the particular router, and all routing information at the certain level of detail for a subset of routers communicating in the first flooding domain, which subset excludes the particular router.

In some of these embodiments, the routing information is sent in response to receiving over the second communication link a request for routing information.

In some of these embodiments, the measure of distance is a number of hops from the particular router to the local router.

In some of these embodiments, the routing information at the certain level of detail indicates an Internet Protocol address associated with each link on a router in the first flooding domain.

In some of these embodiments, the summary routing information for the particular router indicates a set of one or more Internet Protocol addresses that can be reached by the particular router.

In another set of embodiments an apparatus performs one or more steps of the above method.

2.0 Network Overview

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. The header includes information such as the source of the packet, its destination, the length of the payload, and other properties used by the protocol. Often, the data in the payload for the particular protocol includes a header and payload for a different protocol associated with a different layer of detail for information exchange. The protocol in the payload is said to be encapsulated in the protocol of the header for the payload.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A link-state protocol is an example of a routing protocol, which only exchanges control plane messages used for routing data packets sent in a different routed protocol (e.g., IP). To reduce the consumption of network resources and improve scalability, some routing protocols divide a large network up into smaller subnetworks. For example, the OSI protocol suite and the Open Shortest Path First (OSPF) routing protocol divide a network into autonomous systems and areas. An autonomous system (AS) is a portion of a network under the network administration of a single authority, such as an enterprise or Internet service provider (ISP). An AS is divided into areas. Each area is a group of contiguous subnetworks and attached end nodes specified by a network administrator, usually manually. In OSI, routers within an AS communicate with each other using an intermediate system to intermediate system (IS-IS) protocol. According to IS-IS, routing within an area (level 1 routing) uses link-state data that distinguishes each link on each router in the area. Routing between areas (level 2 routing) goes through a level 2 router that aggregates the addresses reachable through that level 2 router. By aggregating routing information for addresses reachable over many links of a level 2 router, the amount of network resources consumed to maintain link-state data and make routing decisions can be reduced and network scalability can be enhanced. The division of routers into areas is conventionally a manual process performed by human network administrators.

Mobile ad-hoc networks (MANETs) involve mobile routers that can join and depart a network or area using wireless communications links. According to existing routing protocols, a router, including a mobile router, accepts attempts by an adjacent router that belongs to the same area to form an adjacency relationship and initiate an exchange of routing information for the area. Such attempts begin, for example, in OSPF with a HELLO message that includes data that indicates the area to which the router that sends the HELLO message belongs. After an adjacency relationship is formed, all detailed routing information for the area is exchanged according to level one routing.

While suitable for manually configured and strictly managed networks, this approach suffers some deficiencies when applied in a MANET context, in which the number of adjacent mobile routers in an area is not under control of a network administrator, but instead is subject to operational considerations. For example, the number of routers belonging to an area may exceed the number at which the network operates efficiently, and causes the network to devote much or most of its resources to passing routing information. With mobile routers, the amount of information that is expected to be passed during a particular time interval is greater than in wired networks in which router adjacencies are relatively stable. As routers move quickly in a MANET, adjacencies are made and broken often, thus changing network topology and causing the flooding of detailed routing information across all routers belonging to the routing area. For example, during a crisis, fire, rescue and police entities, with their mobile routers, converge on a scene of the crisis. Hundreds of adjacencies are suddenly formed, dozens of which change per second as various elements of the response move into and out of range of each other. A MANET can enter a catastrophic state in which all resources are devoted to exchanging routing information in control plane packets and few or no resources are left to handle emergency information in data plane traffic.

Based on the foregoing, there is a clear need for techniques to utilize changing links by sharing routing information with other routers that belong to the same area, which techniques do not suffer the deficiencies of prior approaches.

In the following description, embodiments of the invention are described in the context of wireless routers using link-state flooding areas according to OSPF or IS-IS. However, the invention is not limited to this context and these protocols, but may be applied in any network and protocol that involves domains of mobile or non-mobile intermediate network nodes in a packet-switched communications network in which a different level of routing information detail is exchanged between domains from what is exchanged within a domain. For example, IS-IS or other protocols may be used within a domain but a boundary gateway protocol (BGP) or other summary protocol used between domains. In some embodiments, at least some of the intermediate network nodes are wired nodes that determine domains as they are wired together or encounter wireless nodes.

3.0 Example Network

FIG. 1 illustrates an example mobile ad hoc network 100, according to an embodiment. Network 100 includes wireless routers 110*a*, 110*b*, 110*c*, 110*d*, 110*e*, 110*f*, 110*g*, 110*h*, 110*i*, 110*j*, 110*k*, collectively referenced hereinafter as routers 110. The routers 110 communicate by wireless links, including wireless links 120*a*, 120*b*, 120*c*, 120*d*, among others, collectively referenced hereinafter as links 120. To support routing of data packets between end nodes, not shown, the routers 110 pass routing information among themselves in a routing protocol, such as the OSPF protocol. Although eleven routers 110 and twelve links 120 are shown in network 100 of FIG. 1 for purposes of illustration, in other embodiments, a network includes more or fewer routers communicating over more or fewer links.

Wireless links 120 represent physical or logical links. Some wireless links use different physical channels, such as different radio frequencies, or directional antennas that spatial segregate signals at the same frequency, or time gating that reserves different time slots on the same frequency for different links. Some wireless links send all traffic on the same frequency in all directions, one data packet at a time, and logically segregate traffic onto different logical links based on a label included in the data packet; such links are called logical links.

When networks are wired together, a network administrator assigns each node to an area during configuration, a manual process that grows tedious as the number of nodes increase. The same process, though tedious, works for fixed wireless routers, such as access points installed in homes and buildings. However, with mobile wireless routers, it is impractical for a human to follow the routers around and reassign them to different areas as they move—such a process would render the routers useless for mobile operations. Instead, each wireless router is configured with a base area. Routers that are expected to be in each other's vicinity in the field are configured with the same base area.

Currently, when two nodes come within wireless range on a particular link, they each send a control plane message that invites an adjacency relationship and indicates that it is a router belonging to a particular area. If both nodes belong to the same area, then the nodes form an adjacency relationship and share routing information as members of the same area. If either belongs to a different area, the nodes ignore routing control packets from each other.

If one of the two with different areas is an area boundary router (ABR), then the ABR sets up an inter-area link. The ABR summarizes routing information for its area and passes only summary information to the other. The ABR acts as if it is a member of both areas and gets full routing information from both sides, and must maintain separate detailed routing information for the two areas. The ABR sends only summary information from one area into the other. The link between the ABR and the foreign router then becomes a link in the foreign area. OSPF areas and ABRs are described in more detail in Requests For Comments (RFC) 2328 available from the Internet Engineering Task Force, (IETF). RFC 2328 and other RFC documents are available at the IETF web site at domain ietf.org in directory rfc by inputting a rfc number in a dialog box. The entire contents of RFC 2328 are hereby incorporated by reference as if fully set forth herein.

In mobile ad hoc networks, it is difficult to ensure that the number of routers that belong to the same flooding area in communication at one time do not exceed a practical limit at which routing protocol control plane traffic interferes with data plane traffic. If one selects a small number of routers for each area, then many areas are used to provide mobile routers to a large organization. If only a small fraction are in communication at any one time, then the chances are that many communicating routers are in different areas and require the overhead processing of several ABRs, thus losing the flexibility of link state routing within an area. If one selects a large number of routers for each area, such as all mobile routers for a large organization, then the problems of too many routers, describe above, can occur, often in a crisis situation when the data plane traffic is most important.

According to the illustrated embodiments of the invention, a dynamic overlapping domain process 140 is included on routers (e.g. routers 110a, 110b), so that an area never becomes too large. As a result, an original large area (e.g., all eleven routers 110 in network 100 with the same base area) can be divided into two or more overlapping flooding domains (e.g., domain 130a, 130b, 130c, collectively referenced hereinafter as flooding domains 130). The routing information passed between flooding domains is summary information at a lower level of detail than is passed within a flooding domain. Thus less detailed information is passed across all routers 110 then is passed if this division into multiple flooding domains is not made. As a result, performance of network 100 is preserved even with a large number of routers 110. In the current standard for OSPF and IS-IS, the entire depicted portion of network 100 is the only flooding domain supported.

4.0 Example Router

Figure 2:
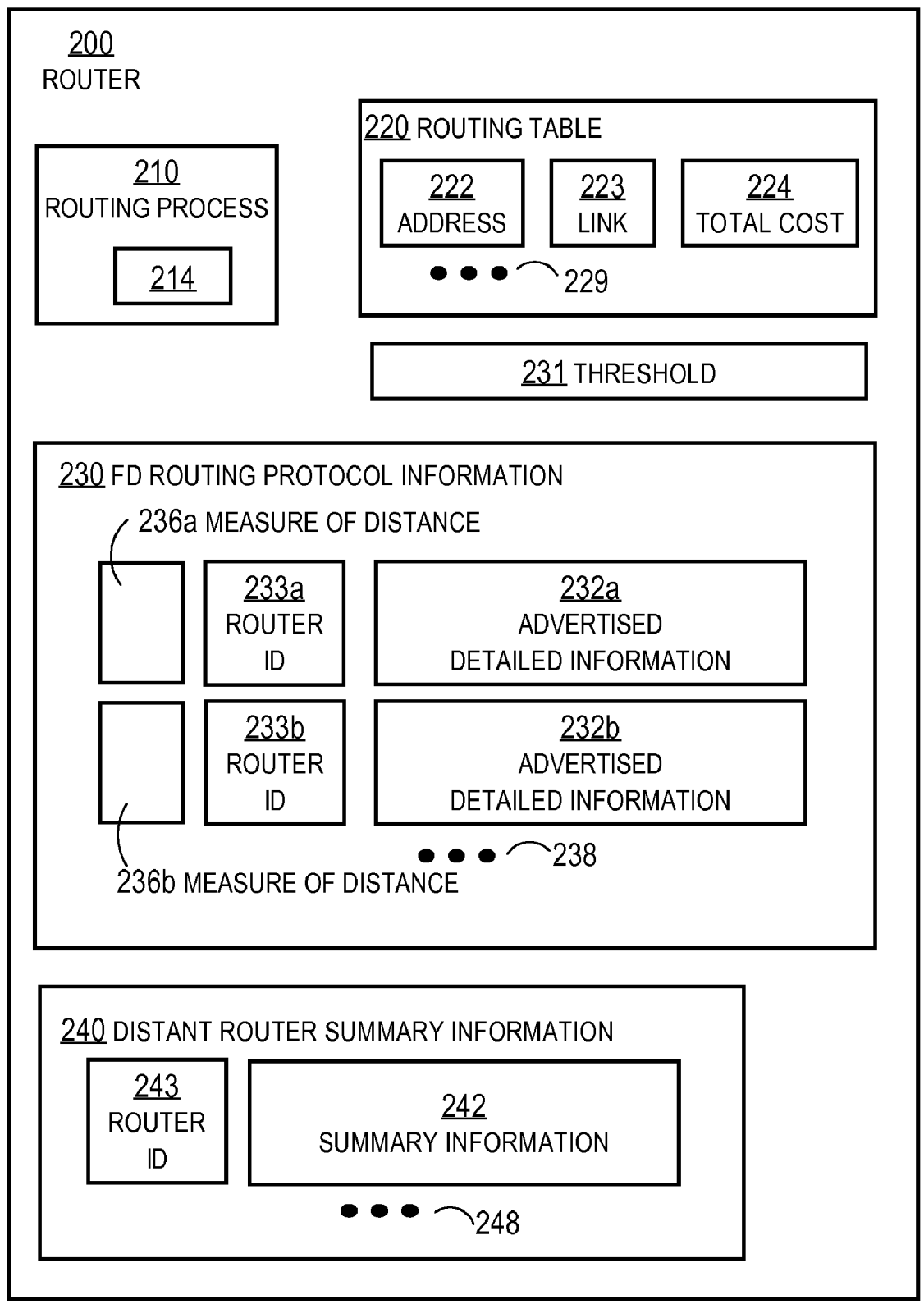
FIG. 2 illustrates an example router, according to an embodiment.

FIG. 2 illustrates an example router 200, according to an embodiment. Router 200 includes a routing process 210, routing table 220, flooding domain (FD) routing protocol information data structure 230, hereinafter referenced as FDRP structure 230, and distant router summary information 240.

The routing process 210 executes on a processor, such as a general purpose processor executing sequences of instructions that cause the processor to perform the routing process. According to embodiments of the invention, routing process 210 includes overlapping area process 214 to form overlapping flooding domains dynamically as described in more detail below with respect to FIG. 4. The routing process 210 stores and retrieves information in the routing table 220 based on information received in one or more routing protocol update messages that are stored in FDRP structure 230.

A routing table 220 is a data structure that includes for each destination that can be reached from the router 200, an address field 222, a link field 223 and zero or more attribute fields. In the illustrated embodiment, the attributes fields include a total cost field 224. Fields for other destinations in routing table 220 are indicated by ellipsis 229.

The FDRP structure 230 is a data structure that includes detailed routing data for every router in any flooding domain that includes the router 200. The FDRP includes advertised information field (e.g., advertised information fields 232a, 232b, collectively referenced hereinafter as advertised information fields 232); and a router identifier (ID) field (e.g., router ID fields 233a, 233b, collectively referenced hereinafter as router ID fields 233). In the illustrated embodiment, FDRP structure 230 also includes measure of distance fields 236a, 236b (collectively referenced hereinafter as measure of distance fields 236). Fields for other routers in FDRP record 230 are indicated by ellipsis 238.

The distant router summary information structure 240 is a data structure that includes summary routing data for certain routers that are above a threshold distance from the local router 200 in any flooding domain that includes the router 200. The structure 240 includes summary information field 242; and a router identifier (ID) field 243. Fields for other routers in record 240 are indicated by ellipsis 248.

Data received from a different protocol, such as an IGP protocol is stored in different data structures, not shown.

Data structures may be formed in any method known in the art, including using portions of volatile memory, or non-volatile storage on one or more nodes, in one or more files or in one or more databases accessed through a database server, or some combination. Although data structures 220, 230 are shown as integral blocks with contiguous fields, e.g. fields 232, in a particular order for purposes of illustration, in other embodiments one or more portions of fields and data structures 220, 230, 240 are stored as separate data structures in the same or different order on the same or different multiple nodes that perform the functions of router 200.

The router ID field 233 holds data that indicates a remote router in the flooding domain from which protocol information for the particular protocol was received at the local router. The advertised information field 232 holds data that is shared among routers in a flooding domain from that router according to the protocol.

The measure of distance field 236 holds data that indicates how far the remote router indicated in router ID field 233 is from the local router 200. Any measure of distance may be used. For example, in some embodiments, the measure of distance is a number of hops along the shortest path from the remote router to the local router. For purposes of illustration, it is assumed that the local router 200 is router 110a. In this illustrated example, remote router 110d is three hops from local router 110a. In other embodiments, other measures are used. For example, in some embodiments, a total temporal delay for traffic between the two routers is used. In some embodiments, a total cost, such as contributes to field 224 in routing table 220, is used as the measure of distance. In some embodiments, this measure is determined by incrementing a field in an update message exchanged between routers during flooding events. In some embodiments, this measure is computed from the flooded information using some algorithm, such as determining the number of hops using the shortest path first (SPF) algorithm. In some such embodiments, measure of distance field 236 is omitted.

For distant routers that have a measure of distance that exceeds a threshold value, the detailed information is summarized. For example, the detailed list for each router of links and connected routers on each link at is converted to a summarized list of reachable address from that router. The summarized list is stored in field 242 in association with the router ID in field 243 for the distant router.

The routing process 210 uses the information in the FDRP structure 230, distant router summary information 240 and data structures (not shown) for the inter-area protocols, such as IGP and EIGRP, to construct the routing table 220. On an ABR, the routing process also summarizes data from FDRP structure 230 to send in a different protocol to routers in a different area. As is described in more detail in a later section, process 214 summarizes data from FDRP structure 230 to send to routers in a different flooding domain within the same area.

In the illustrated embodiment, the router 200 includes in record 231, a threshold field 231. The threshold indicated by data in the threshold field is used to determine which routers in a flooding area are distant routers, and thereby to help determine a maximum size for a flooding domain. For purposes of illustration, it is assumed that the measure of distance is number of hops and that the threshold is two hops. When these structures are used in conjunction with the messages in FIG. 3 and the method of FIG. 4, as described below, automatic overlapping flooding domains are formed that do not exceed three hops in extent.

5.0 Modified Control Plane Packets

In the illustrated embodiment, routing protocol control plane packets are modified to support automatic division and coalescence of flooding domains of routers within which routing information is shared at a higher level of detail than is shared between different flooding domains. Such modifications are described in U.S. patent application Ser. No. 11/513,099 filed Aug. 29, 2006 and entitled "Method and Apparatus for Automatic Sub-division of Areas that Flood Routing Information," by Retana and White. In other embodiments, other control packets may be used.

Figure 3A:
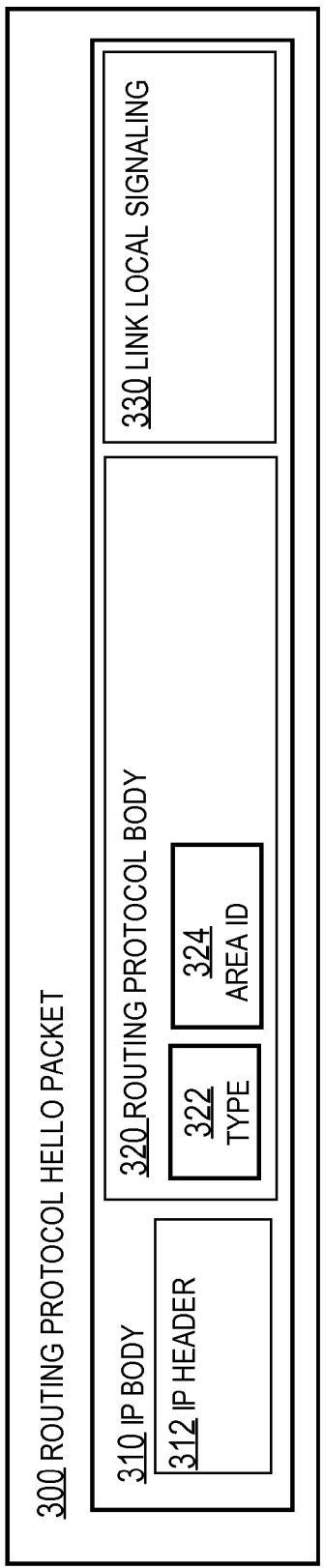
FIG. 3A illustrates an example routing protocol HELLO packet, according to an embodiment.

FIG. 3A illustrates an example routing protocol adjacency invitation packet (called a HELLO packet 300, hereinafter for convenience), according to an embodiment. In the illustrated embodiment, the HELLO packet 300 is a modified OSPF HELLO packet. The packet 300 includes an Internet Protocol (IP) body field 310 that includes an IP header field 312 and IP payload. The IP payload includes a routing protocol body field 320 and a link local signaling (LLS) field 330.

The routing protocol body field, such as an OSPF message, includes a type field 322 and an area ID field 324. The type field 32 holds data that indicates the packet is a HELLO packet, inviting the recipient of the packet to form an adjacency relationship with the sending packet. The HELLO packet is not forwarded to another router and so always indicates a direct communication between the sending router and the recipient router. The area ID field 324 holds data that indicates an area to which the sending router belongs, such as a configured area ID. A router that is not an ABR ignores a HELLO packet that indicates an area ID in field 324 different from the recipient's area ID.

As is well known, information not included in the routing protocol body 320 of a given type can nonetheless be passed in the same IP body 310. The routing protocol body frame 320 includes a length field (not shown) that indicates the length of the routing protocol body field 320. The IP header field 312 includes an IP length field (not shown) that indicates a length of the IP body field. The difference between the standard length of the IP header and the difference between these two lengths gives the length of the LLS field 330. The LLS field can thus be made long enough to pass additional information in the HELLO packet 300.

Figure 3B:
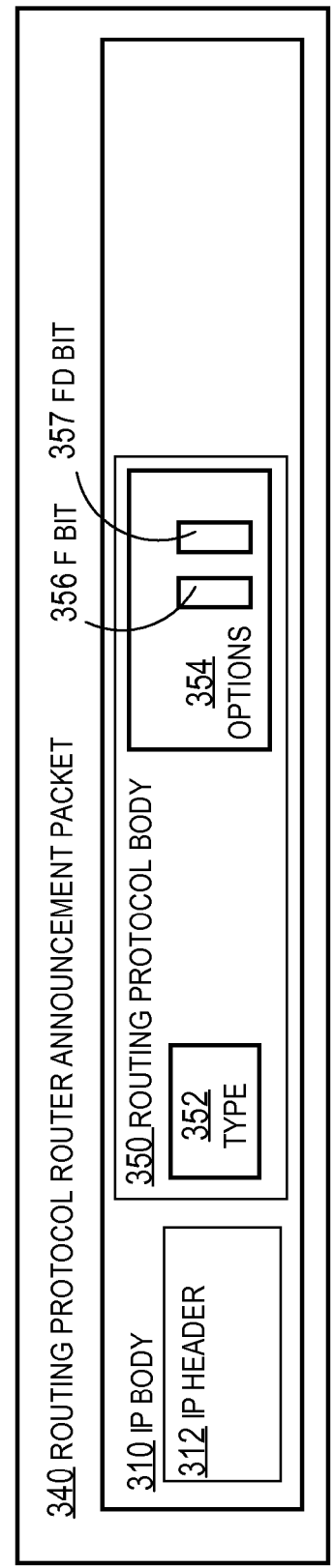
FIG. 3B illustrates an example routing protocol router announcement packet, according to an embodiment.

FIG. 3B illustrates an example routing protocol router announcement packet 340, according to an embodiment. In the illustrated embodiment, the router announcement packet 340 is a modified OSPF router link state advertisement (LSA) packet (router LSA packet). In some embodiments, the announcement packet 340 is a modified IS-IS router link state protocol data unit (LSP) packet (router LSP packet). The router announcement packet 340 includes an IP body field 310 that includes an IP header field 312 and IP payload. The IP payload includes a routing protocol body field 350.

The routing protocol body field 350, such as an OSPF message, includes a type field 352 and an options field 354. The type field 352 holds data that indicates the packet is a router announcement packet, allowing the recipient of the packet to record information about the router. The options field 354 holds data that indicates optional information about the sending router in FDRP structure 230. According to the illustrated embodiment, the definitions for options field 354 are modified to include definitions for a F-bit 346 and a FD-bit 357.

The F-bit is used to indicate that the sending router supports multiple flooding domains within an area. The F-bit holds data (e.g., the binary value 1) that indicates "True" when the router supports multiple flooding domains in an OSPF or IS-IS flooding area; and holds data (e.g., the binary value 0) that indicates "False" when the router only supports complete routing information flooding in an OSPF or IS-IS flooding area. The F-bit is defined so that a router that follows an unmodified standard OSPF or IS-IS protocol has a "False" value, by default, in the F-bit.

The FD-bit is used to indicate that the sending router is a boundary between multiple flooding domains within an area. Such a router is called herein a flooding domain border router (FDBR). The FD-bit holds data (e.g., the binary value 1) that indicates "True" when the router is a FDBR; and holds data (e.g., the binary value 0) that indicates "False" when the router is not a FDBR. The FD-bit is ignored if the F-bit is set to "False." According to the illustrated embodiment, most routers 110 are boundaries between different flooding domains.

FIG. 3C illustrates an example routing protocol inter-area packet 360, according to an embodiment. In the illustrated embodiment, the inter-area packet 360 is a modified OSPF LSA packet. In some embodiments, the inter-area packet 360 is a modified IS-IS LSP packet. The inter-area packet 360 includes an IP body field 310 that includes an IP header field 312 and IP payload. The IP payload includes a routing protocol body field 361.

The routing protocol body field 361, such as an OSPF update message, includes a type field 362, a flooding scope field 363 and summarized route information field 364. The type field 362 holds data that indicates the packet is an inter-area packet, allowing the recipient of the packet to store the data and use it properly to update the routing table. According to the illustrated embodiment, the definitions for flooding scope field 363 are modified to include a new value for a Total Area Scope. In an illustrated embodiment, the Total Area Scope is indicates by using a reserved value, 1/1, for an S1/S2 field in the OSPF standard. The new value for Total Area Scope indicates that the summarized data in the packet is based on data flooded through the entire area, i.e., that the area is not subdivided into two or more flooding domains. This is the standard scope for OSPF and IS-IS at the time of this writing and is indicated by a current standard value called Area Scope. According to the illustrated embodiment, however, the original value for Area Scope is re-interpreted and now indicates that the summarized data in the packet is based on data flooded through only one flooding domain inside an OSPF area, i.e., that the area includes two or more flooding domains.

FIG. 3D illustrates an example routing protocol inter-domain packet 370, according to an embodiment. In the illustrated embodiment, the inter-domain packet 370 is a modified OSPF LSA packet. In some embodiments, the inter-domain packet 370 is a modified IS-IS LSP packet. The inter-domain packet 370 includes an IP body field 310 that includes an IP header field 312 and IP payload. The IP payload includes a routing protocol body field 371.

The routing protocol body field 371, such as an OSPF update message, includes a type field 372, a flooding scope field 373 and summarized route information field 374. The type field 372 holds data that indicates the packet is an inter-domain packet, allowing the recipient of the packet to store the data and use it properly to update the routing table. A new code for type is introduced to the standard to indicate this new type of packet, an inter-domain packet. The summarized route information in an inter-domain packet is always based on flooding data within the domain, and therefore the flooding scope field 373 always holds a value indicating Area Scope. The format of data in the summarized route information field 374 is the same as the format in the summarized route information field 364 for an inter-area packet. Thus inter-domain packet 370 looks like an inter-area packet 360 except for the value in the type field 372 which is always different for the two packets. (Note that a value of Total Area Scope in a flooding scope field also distinguishes the two packets, because only an inter-area packet 360 may contain the Total Area Scope value in the flooding scope field.)

Figure 3E:
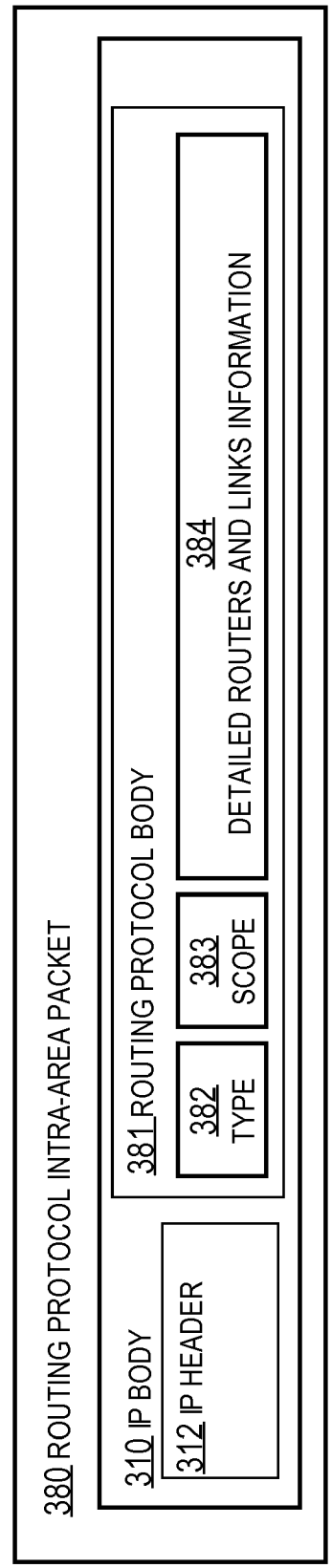
FIG. 3E illustrates an example routing protocol intra-area packet, according to an embodiment.

FIG. 3E illustrates an example routing protocol intra-area packet 380, according to an embodiment. In the illustrated embodiment, the intra-area packet 380 is a modified OSPF LSA packet. In some embodiments, the intra-area packet 380 is a modified IS-IS LSP packet. The intra-area packet 380 includes an IP body field 310 that includes an IP header field 312 and IP payload. The IP payload includes a routing protocol body field 381.

The routing protocol body field 381, such as an OSPF update message, includes a type field 382, a flooding scope field 383 and detailed routers and links information field 384. The type field 382 holds data that indicates the packet is an intra-area packet, allowing the recipient of the packet to store the data and use it properly as detailed routers and links information to update the routing table and a record (e.g., record 230) in FDRP structure 230. A standard code for intra-area type indicates this type of packet. The format of data in the detailed routers and links information field 384 is the same whether the details are for a domain or the whole OSPF/IS-IS flooding area. Thus, the intra-area packet 380 is always used for details of a single flooding area, whether that flooding area is the same as the whole OSPF/IS-IS flooding area or a flooding domain portion of the whole OSPF/IS-IS flooding area. A value of Total Area Scope in the flooding scope field 383 indicates that the detailed routers and links information 384 is for the whole OSPF/IS-IS flooding area. A value of Area Scope in the flooding scope field 383 indicates that the detailed routers and links information 384 is for only a portion of the OSPF/IS-IS flooding area that constitutes one flooding domain.

Although message and fields are shown in FIG. 3A, FIG. 3B, FIG. 3C, FIG. 3D and FIG. 3E as contiguous blocks of data arranged in a particular order for purposes of illustration, in other embodiments one or more messages, fields or portions thereof are arranged in a different order in one or more messages.

6.0 Example Method for Sharing Routing Information

According to the illustrated embodiment, a flooding domain for sharing routing information at a certain level of detail is automatically generated or coalesced based on the threshold and the measure of distance from a local router. This method uses the structures and control plane message fields described above.

FIG. 4 illustrates at a high level an example method 400 for sharing routing information among two or more automatically divided routing information flooding domains, according to an embodiment. Although steps are shown in a particular order for purposes of illustration, in other embodiments one or more steps are performed in a different order or overlapping in time on one or more processors executing in series or in parallel, or one or more steps are omitted, or the steps are changed in some combination of ways.

For purposes of illustration it is assumed that routers 110 are arranged as depicted in FIG. 1 and that the measure of distance is number of hops and that the value in the threshold field 231 in each router is 2. For the following discussion, it is further assumed that router 110a is the local router 200.

In step 410, a router receives detailed routing information on a first link for a first flooding domain. For example, router 110a receives over link 120a from router 110b detailed routing information for all routers 110b, 110c, 110d, 110j, 110k in flooding domain 130a. The detailed routing information sent by router 110b is limited to domain 130a by an identical overlapping domain process 140 executing on router 110b, for reasons that become apparent after describing method 400 at router 110a. Similarly, router 110a receives over link 120d from router 110g detailed routing information for all routers 110e, 110f, 110g, 110h, 110i in flooding domain 130b. The detailed routing information sent by router 110d is limited to domain 130b by an identical overlapping domain process 140 executing on router 110g.

In step 420, the local router determines a measure of distance to the next router in the first flooding domain. For example, after receiving detailed information in flooding domain 130b from router 110g, local router 110a determines that remote router 110e is three hops away.

In step 430, it is determined whether the measure of distance is greater than the threshold. If so, control passes to step 440. If not, control passes to step 436. For example, local router 110a determines that the three hops to remote router 110e is greater than the threshold (2 hops stored in threshold field 231), and control passes to step 440.

In step 440, routing information for the distant remote router is summarized. For example, the list of links and routers connected to remote router 110e in are summarized as a list of IP addresses that can be reached through router 110e and associated costs in summary information field 242 in association with data in field 243 that indicates router 110e. Control then passes to step 436.

In step 436, it is determined whether there is another router in the first flooding domain. If so, control passes back to step 420. If not, control passes to step 450. For example, it is determined that there are still several routers 110f, 110g, 110h, 110i in flooding domain 130b to be examined; and control passes back to step 420.

Steps 420, 430, 440, 436 constitute a loop that examines all the remote routers in the first flooding domain in turn. During this loop, it is determined that routers 110*f*, 110*g*, 110*h* are less than the threshold distance away and that their routing information is not summarized. Instead their detailed routing information is stored in field 232 in association with data that indicates the router ID in field 233 and the measure of distance in field 236. Similarly, it is determined that router 110*i* is a distant remote router and its detailed routing information is also summarized in step 440 and stored in distant router summary information 240. After examining router 110*i*, it is determined in step 436 that there is no further router in the flooding domain 130*b*, and control passes to step 450.

In step 450, it is determined whether routing information is to be passed over a different link. For example, it is determined whether conditions are satisfied for sending routing information over link 120*a* with router 110*b* based on the information received over link 120*d* from router 110*g*. Any conditions may be set for passing routing information over a different link. For example, in some embodiments, upon receipt of any new information over any link, all routing information is passed over all other links. In some embodiments, routing information is sent over a link when a request for routing information is received on that link. In some embodiments, all routing information is passed over all other links at prescribed times or intervals of time from a previous distribution of routing information. If it is determined in step 450, that routing information is not to be passed on a different link, control passes to step 460.

In step 460, other router processing continues. For example, summary routing information is received about one or more distant routers. The routing table is updated with the detailed and summary routing information received.

Loops in the routing table are avoided during step 460 using any mechanism available. To understand looping, consider that from local router 110*a*, addresses reachable from router 110*i* can be reached over link 120*d* with router 110*g* to router 110*h* to router 110*i* or over link 120*a* with router 110*b* to router 110*j* to router 110*k* to router 110*i*. Thus the addresses reachable through router 110*i*, including routers 110*h*, 110*g* are available over both link 120*a* and link 120*d*. An update message received over link 120*a* is used to update the routing table at router 110*a* and passed over link 120*d*, which forwards it on with an increment in cost. It eventually gets back over link 120*a* to router 110*a*. Router 110*a* updates its table again, increments the cost, and forwards the update message again over link 120*d*. The spurious process continues until the cost metric reaches its maximum value.

In some embodiments, loping is avoided because the local router gives preference to a link to a remote router for which the local router has detailed information rather than to a link to a router for which the local router has only summary (e.g., reachability) information. Such a preference normally results in a smaller metric and avoids looping that can lead to repeated increments and maximum (effectively infinite) metrics in a routing table. In some embodiments, looping is avoided by including a name of a domain from which an advertisement originated, as described by Retana et al. in U.S. patent application Ser. No. 11/333,221 entitled "Techniques for Detecting Loop-free Paths that Cross Routing Information Boundaries." In the illustrated embodiment, the links for router 110*i* are passed to router 110*a* in domain 130*b*, but only summary information about router 110*i* reachable addresses are sent to router 110*a* from domain 130*a*. Thus, the routing table on router 110*a* prefers routes to addresses reachable at router 110*i* through link 120*d*. The routing table on router 110*a* does not list addresses reachable at router 110*i* for link 120*a*, in this embodiment.

Sometimes, during step 460, control passes back to step 450 at a later time. Sometimes, during step 460, detailed routing information is received over the same or different link, and control passes to step 410.

If it is determined, in step 450, that routing information is to be passed on a different link, control passes to step 452. For example, in response to receiving detailed information at router 110*a* from router 110*g* over link 120*d* during step 410, conditions are satisfied for passing information over link 120*a*, and control passes to step 452.

In step 452, detailed information is sent over the different link only for a subset of routers of the first domain that excludes the distant routers. The detailed information is sent in intra-area messages, such as message 380 depicted in FIG. 3E. For example, detailed information is sent over the link 120*a* only for a subset of routers of the flooding domain 130*b* that excludes the distant routers 110*e* and 110*i*. The effective flooding domain, as far as router 110*b* is concerned are the routers 110*a*, 110*f*, 110*g*, 110*h* in domain 130*c*, as well as router 110*b* on the boundary. Domain 130*c* overlaps domain 130*b*. Domain 130*c*, like domain 130*b* includes only routers that are three hops apart.

In step 454, summary data for the distant routers in the first flooding domain is sent over the different link using inter-domain messages. For example, the summary information is sent in an inter-domain message 370 depicted in FIG. 3D. Control passes back to step 460.

Using the method 400, detailed information is passed only for four routers, reducing the amount of detailed information passed over link 120*a*. This reduces the consumption of network resources on network 100 compared to having all eleven routers in the same flooding area.

In many embodiments, steps 410, 420, 450, 454 are event driven, i.e., are executed upon the occurrence of an event, such a change in network topology, as well as or in addition to being executed in sequence as shown.

7.0 Implementation Mechanisms—Hardware Overview

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are example forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

8.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   receiving on a first communication link at a local router all routing information at a certain level of detail for each router of a plurality of routers communicating in a first flooding domain;
   determining a measure of distance from a particular router in the first flooding domain to the local router;
   determining whether the measure of distance exceeds a threshold, wherein the distance reflects a number of hops between the local router and the particular router in the first flooding domain, wherein the distance is provided in a field of an update message exchanged between the local router and the particular router during a flooding event in the first flooding domain, and wherein the local router gives preference to a remote router that exceeds the threshold and for which the local router has the certain level of detail; and
   if it is determined that the measure of distance exceeds the threshold, then:
      determining summary routing information with less than the certain level of detail for the particular router, wherein the summary information includes an Internet protocol (IP) address for the particular router and a cost associated with reaching the particular router; and
      sending, over a different second communication link at the local router, routing information as open shortest path first (OSPF) link state advertisement (LSA) packets that include:
         the summary information for the particular router; and
         all routing information at the certain level of detail for a subset of routers communicating in the first flooding domain, wherein the subset excludes the particular router.

2. The method as recited in claim 1, said step of sending the routing information further comprising the steps of:
   receiving over the second communication link a request for routing information; and
   sending the routing information in response to the request.

3. The method as recited in claim 1, wherein a second measure of distance for a second router from the local router is determined by evaluating a delay time from the second router to the local router.

4. The method as recited in claim 1, wherein a second measure of distance for a second router from the local router is determined by evaluating a sum of link costs from the second router to the local router.

5. The method as recited in claim 1, wherein the summary routing information for the particular router indicates an Internet Protocol address that can be reached by the particular router.

6. The method as recited in claim 1, wherein the routing information at the certain level of detail indicates an Internet Protocol address associated with each link on a router in the first flooding domain.

7. The method as recited in claim 1, wherein the first communication link is a wireless link.

8. The method as recited in claim 1, wherein the plurality of routers comprises a mobile ad hoc network.

9. A system comprising:
  means for receiving on a first communication link at a local router all routing information at a certain level of detail for each router of a plurality of routers communicating in a first flooding domain,
  means for determining a measure of distance from a particular router in the first flooding domain to the local router;
  means for determining whether the measure of distance exceeds a threshold, wherein the distance reflects a number of hops between the local router and the particular router in the first flooding domain, wherein the distance is provided in a field of an update message exchanged between the local router and the particular router during a flooding event in the first flooding domain, and wherein the local router gives preference to a remote router that exceeds the threshold and for which the local router has the certain level of detail; and
  means for distributing summary routing information if it is determined that the measure of distance exceeds the threshold, said means for distributing summary routing information further comprising:
    means for determining summary routing information with less than the certain level of detail for the particular router, wherein the summary information includes an Internet protocol (IP) address for the particular router and a cost associated with reaching the particular router; and
    means for sending, over a different second communication link at the local router, routing information as open shortest path first (OSPF) link state advertisement (LSA) packets that include:
      the summary information for the particular router; and
      all routing information at the certain level of detail for a subset of routers communicating in the first flooding domain, wherein the subset excludes the particular router.

10. The system as recited in claim 9, wherein the first communication link is a wireless link.

11. An apparatus comprising:
  a first network interface that is in communication with a packet-switched network for communicating therewith a data packet;
  a second network interface that is in communication with a packet-switched network for communicating therewith a data packet; and
  a processor configured for:
  receiving on the first network interface all routing information at a certain level of detail for each router of a plurality of routers communicating in a first flooding domain,
  determining a measure of distance from a particular router in the first flooding domain to the apparatus, wherein the distance is provided in a field of an update message exchanged between the apparatus and the particular router during a flooding event in the first flooding domain;
  determining whether the measure of distance exceeds a threshold, wherein the distance reflects a number of hops between the apparatus and the particular router in the first flooding domain, and wherein the apparatus gives preference to a remote router that exceeds the threshold and for which the apparatus has the certain level of detail; and
  if it is determined that the measure of distance exceeds the threshold, then:
    determining summary routing information with less than the certain level of detail for the particular router, wherein the summary information includes an Internet protocol (IP) address for the particular router and a cost associated with reaching the particular router; and
  sending, over the second network interface, routing information as open shortest path first (OSPF) link state advertisement (LSA) packets that include:
    the summary information for the particular router, and
    all routing information at the certain level of detail for a subset of routers communicating in the first flooding domain, wherein the subset excludes the particular router.

12. The apparatus as recited in claim 11, said step of sending the routing information further comprising the steps of:
  receiving over the second communication link a request for routing information; and
  sending the routing information in response to the request.

13. The apparatus as recited in claim 11, wherein a second measure of distance for a second router from the apparatus is determined by evaluating a delay time from the second router to the apparatus.

14. The apparatus as recited in claim 11, wherein a second measure of distance for a second router from the apparatus is determined by evaluating a sum of link costs from the second router to the apparatus.

15. The apparatus as recited in claim 11, wherein the measure of distance is a sum of link costs from the particular router to the apparatus.

16. The apparatus as recited in claim 11, wherein the summary routing information for the particular router indicates an Internet Protocol address that can be reached by the particular router.

17. The apparatus as recited in claim 11, wherein the routing information at the certain level of detail indicates an Internet Protocol address associated with each link on a router in the first flooding domain.

18. The apparatus as recited in claim 11, wherein the first communication link is a wireless link.

19. The apparatus as recited in claim 11, wherein the plurality of routers comprises a mobile ad hoc network.

* * * * *